United States Patent
Boys et al.

(10) Patent No.: US 6,705,441 B1
(45) Date of Patent: Mar. 16, 2004

(54) CONTROL OF SERIES-RESONANT INDUCTIVE PICKUPS

(75) Inventors: John Talbot Boys, Auckland (NZ); Oskar Heino Stielau, Auckland (NZ)

(73) Assignee: Auckland Uniservices Limited, Auckland (NZ)

(*) Notice: Subject to any disclaimer, the term of this patent is extended or adjusted under 35 U.S.C. 154(b) by 0 days.

(21) Appl. No.: 10/070,620

(22) PCT Filed: Sep. 6, 2000

(86) PCT No.: PCT/NZ00/00175
§ 371 (c)(1), (2), (4) Date: Jun. 25, 2002

(87) PCT Pub. No.: WO01/18936
PCT Pub. Date: Mar. 15, 2001

(30) Foreign Application Priority Data

Sep. 9, 1999 (NZ) .................................................. 337716

(51) Int. Cl.$^7$ .................................................. B60L 9/00
(52) U.S. Cl. ........................................................ 191/10
(58) Field of Search ................................ 191/10, 2, 3, 4

(56) References Cited

U.S. PATENT DOCUMENTS 4,800,328 A  1/1989  Bolger et al.
5,207,304 A * 5/1993  Lechner et al. ................ 191/10
5,839,554 A  11/1998  Clark
5,898,579 A  4/1999  Boys et al.

FOREIGN PATENT DOCUMENTS

WO    WO 99/26329    5/1999

* cited by examiner

Primary Examiner—S. Joseph Morano
Assistant Examiner—Robert J. McCarry, Jr.
(74) Attorney, Agent, or Firm—Young & Thompson

(57) ABSTRACT

A series resonant inductive pickup has a bi-directional solid state switch in series with an inductor and a capacitor is controlled by switch control elements capable of causing the switching elements to repetitively be in either an open or a closed state, so that by varying the closed: open ratio of the switch the time-averaged amount of power picked up by the power pickup can be controlled. Switch is controlled by output of a voltage comparing circuit. A reference voltage source provides a basis for comparison of some fraction of a supply voltage in order to cause the switch to operate. The magnitude of capacitance in relation to the current drawn by the load determines the repetition rate of ON or OFF commands to the switch. If the current drawn by the load tends to zero, the proportion of time during which the switch is open will tend to 100%.

20 Claims, 2 Drawing Sheets

US 6,705,441 B1

CONTROL OF SERIES-RESONANT INDUCTIVE PICKUPS

FIELD OF THE INVENTION

This invention relates to apparatus and methods for controlling the current in a resonant secondary or pickup circuit for an inductive power transfer circuit, capable of collecting electricity from a primary distribution pathway having one or more conductors carrying alternating current.

BACKGROUND

In present day inductive power transfer (IPT) systems there is an energisable trackway having at least one conductor (the primary), each of which is surrounded by an alternating magnetic field during use One or more pickup devices, each of which includes at least one pickup winding, form part of the system. Each is placed so as to intercept a part of the alternating magnetic field of the primary and thereby induce a useful current in the winding. Usually, the frequency of the alternating current in the primary is more or less matched to a resonant frequency within the pickup. Practical supply frequencies range from a mains frequency (50 Hz) up to commonly used frequencies in the 5–56 kHz range, and as components capable of handling high power at higher frequencies become available, the usable frequency may become higher Generally, the supply frequency should be stable.

Resonant pickups may be either parallel-tuned or series-tuned in order to improve the transfer of power Control of the power picked up from an IPT system has been a problem The problem of control of power transfer might be solved by setting up a system with a high capacity if uncontrolled and then either decoupling the link between the primary pathway and the secondary pickup in some way, or by "wasting" excess power within the pickup circuit Decoupling by interfering with the magnetic circuit itself could be done by altering one or more of the dimensions of the gap, by adding or subtracting permeable materials, by introducing a conductive block in which eddy currents may be generated, or (as a passive over-supply limit) by incorporating a saturable ferri- or ferromagnetic element into the magnetic circuit.

A related form of decoupling comprises changing the resonant frequency of (usually) the pickup. Because this form can settle to a stable frequency if the supply and load powers are stable, we regard it as a T=infinity configuration.

PRIOR ART

Many plans for IPT systems existed in the latter 19th century; for example Tesla held a patent for powering a train using a high-voltage system with capacitative coupling, and a number of inventors filed patents for at least telegraph message transfer by inductive means across a wide gap from a moving railway triage to a stationary trackway.

In the 20$^{th}$ century there were many attempts to make commercial use of IPT systems, perhaps the most successful of these for larger power applications (e.g. to moving vehicles) is that of the Boys (the present inventor).

Otto. GB1418128 (December 1974), described a series-tuned pickup having a capacity suitable for use in powering a bus. Control of the power picked up was not included. Boys et al, in U.S. Pat. No. 5,293,308 disclosed a parallel-tuned pickup control.

The problem to be solved is, to provide control over the transfer of inductive power into any one pickup device to be at a level that matches the power being consumed If the transferred power is too small the load is starved. If the transferred power is too large, the surplus current circulates within the pickup or over-supplies the load and may cause damage. Furthermore, surplus circulating current, by generating its own field, can block the onwards passage of primary power to other secondary circuits sharing the same primary conductor.

Parallel-Tuned Pickup Control

Continuous (steady) control. Clearly, an absence of switchable control elements is no control at all The saturable inductor of Boys et al as described in NZ329195 (intended for control of overload or fault conditions rather than in normal usage) is also a form of continuous control.

Per-cycle control, where the switching action is timed to occur in a specified relationship with the phase of the circulating current in the resonant pickup, and occurs usually within every cycle:

Turner (assigned to Boeing) in U.S. Pat. No. 4,914,539) (Apr. 3, 1990) describes a regulator circuit in which a 38 kHz current is shorted out for a variable duration per cycle, during a phase-related period following the moment when the voltage passes through zero with a negative slope. This is a regulator for inductively coupled power, for a specific application (aircraft passenger seat entertainment electronics). In the example, semiconductor switching (to cause a shunt) occurs for a controllable period during each cycle. Any excess power is simply shunted to ground. This application exhibits a relatively small variation in load demand. For efficiency reasons this approach is not amenable to scaling upwards, particularly in situations in which the load requirements vary and may go down to zero. The semiconductors are required to work well at high frequency (low reverse recovery time is a desired feature).

Brooks (U.S. Pat. No. 5,045,770 or PCT/AU89/00035) may also be of this type. Brooks describes a shunt circuit, integrated onto a single VLSI chip, for regulating power received from an alternating, loosely coupled, external magnetic field. The regulator shunts input power and includes several modes of operation: diverting excess energy into a load, reducing the Q factor of the pickup circuit, and reducing the power match to the load. A practical circuit includes a synchronous rectifier. This invention is not upwardly scalable.

Series-tuned Pickup Control

Continuous (steady) control has been described by Ehgtesadhi et al, within a number of publications in relation to a variable capacitor serving as the series-tuned capacitor, wherein the capacitor may be switched through 64 steps from zero to slightly beyond the resonant condition, so controlling the output from the more or less tuned pickup.

The saturable inductor of Boys et al as described in NZ329195 (intended for control of overload or fault conditions rather than in normal usage) is also a form of continuous control and could be used in a series-connected resonant circuit.

Per-cycle control, where the switching action is timed to occur in a specified relationship with the phase of the circulating current in the resonant pickup:

Pivnjak and Weiss in Elektrie vol 34 (1980), pp 339 to 341 describe a 5 kHz series-resonant pickup having thyristor switching and (see FIG. 5) phase-related control means, together capable of varying the current circulating within the series-tuned pickup and hence of varying the output.

Lukacs B Nagy I, et al (Proceedings of the 4th Power Electronics conference, Budapest, 1981) also describe at pages 83 to 92, a series-resonant pickup having thyristor switching and phase-related control means, together capable of varying the current circulating within the series-tuned pickup and hence of varying the output.

OBJECT

It is an object of this invention to provide an improved pickup power control system for inductive power transfer or at least to provide the public with a useful choice.

STATEMENT OF INVENTION

In a first broad aspect the invention provides for an inductive power transfer system, a power pickup device with a series resonant circuit comprising a pickup coil and a resonating capacitor selected so that the pickup is capable of resonance at a system-wide frequency, the power pickup device further including power conditioning means capable of converting electricity that has been picked up into a conditioned form suitable for consumption by a load, wherein apparatus capable of controlling the amount of power picked up by the power pickup device comprises switching means in series with the pickup coil and in series with the resonating capacitor, together with switch controlling means capable of causing the switching means to repetitively be in either an open or a closed state, so that by varying the respective proportion of time that the switching means is either open or is closed the time-averaged amount of power picked up by the power pickup device can be controlled.

Preferably a repetitive cyclic operation of the switching means is relatively slow, so that induced resonating currents may substantially die away during a normal "OFF" interval.

Note that switching rate drops as the size of the installation rises, and inductive power transfer installations capable of handling from less than one watt to perhaps one megawatt or more are known Typical repetition rates vary accordingly, from over 1 kHz to less than 100 Hz. Thus it is preferred that the switch control means is capable of providing a repetitive cyclic operation of the switching means which is inversely proportional to the amount of power to be collected by the pickup device.

A preferred switching means comprises a solid-state switch.

Preferably the switching means is a bidirectional switching means capable of controlling an alternating current.

Preferably the switching means is capable of carrying at least a resonating current of a usual magnitude circulating within the pickup.

One preferred solid-state switching means employs the type of device known as an insulated gate bipolar transistor.

A more preferred solid-state switching means comprises a set of inverse parallel fast-recovery thyristors and an example switch device is an asymmetrical silicon-controlled rectifier (ASCR).

Preferably the switch controlling means is capable of responding to the magnitude of the conditioned power in a manner that tends to regulate the magnitude of the conditioned power.

More preferably the switch controlling means is capable of responding to the voltage of the conditioned power Preferably the switch controlling means is also capable of responding to the instantaneous voltage levels present at each side of the switching means and hence causing the switching means to close at an instant when the the voltage levels present at each side of the switching means are substantially the same.

Preferably the switch controlling means is further capable of detecting the current passing through the switching means and is capable of determining when that current is at a zero crossing point, in order to determine an instant which the switching means may be opened.

PREFERRED EMBODIMENT

The preferred embodiments to be described and illustrated in this specification are provided purely by way of example and are in no way intended to be limiting as to the spirit or the scope of the invention.

EXAMPLE 1

This invention relates to a secondary pickup having for control purposes a combination of major circuit components. See FIG. 1, in which the circuit elements to the left of the rectifier R are: a pickup winding W capable of intercepting a magnetic field surrounding a primary inductive conductor P a resonant circuit (of inductor W and series resonating capacitor B) are present at an input of the rectifier R. Note that C and $S_B$ comprise elements of the prior art shortable parallel-tuned pickup (which lacks items B and $S_A$). They do not exist within the prototype series-tuned, controllable pickup.

A second circuit is located at an output of the rectifier R, generally including a load L (which may be variable) and a smoothing capacitor D. $S_C$ is an alternative position for a shorting switch for a parallel-tuned circuit. Most loads require a supply of DC, or sometimes of AC of a frequency other than that of the primary trackway (such as for use by induction motors).

The general requirement is that the power transferred across the space should be equal to the power consumed within the load (plus circuit wastage).

Figure 1:
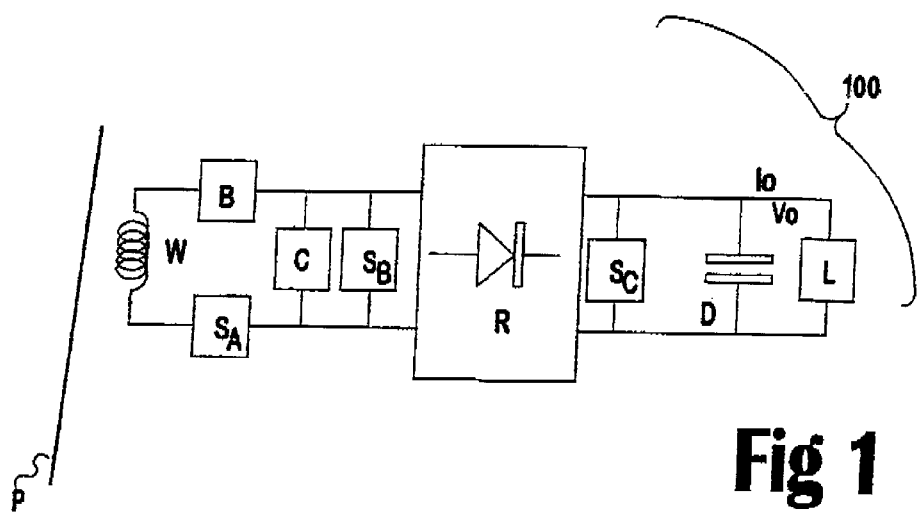
FIG. 1: shows a simplified prior-art circuit diagram of a pickup control means involving shorting the pickup circuit.
Figure 2:
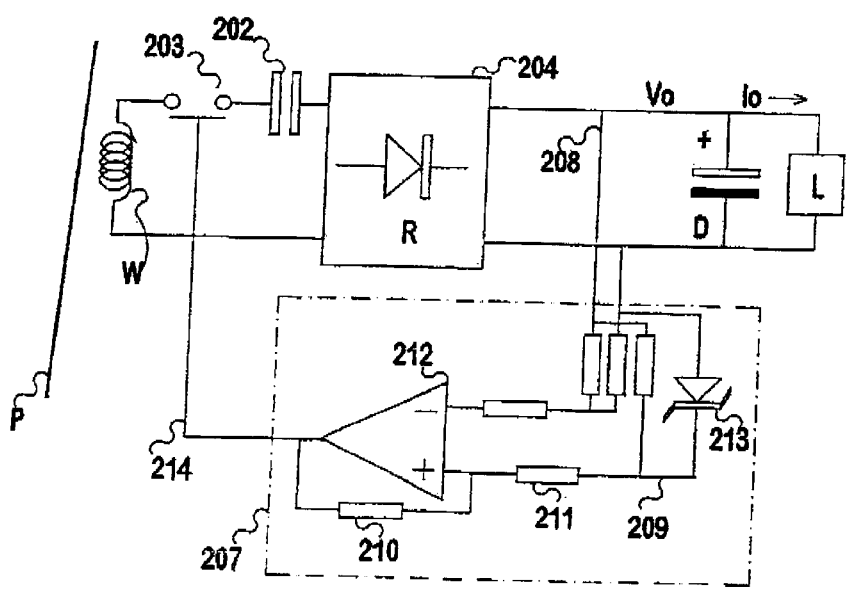
FIG. 2: shows a simplified circuit diagram of a pickup control means, including regulation means according to the invention.

FIG. 2 illustrates a simple version of a controlled, series-resonant pickup within which the switch 203 is the equivalent of $S_A$ in FIG. 1. Closing the switch completes the circuit and allows the output to rise. Opening the switch interrupts the series circuit, stops power delivery, and halts resonance. This switch is controlled by output 214 of a voltage comparing circuit 212, here an operational amplifier having positive feedback according to the ratio of the values of 210 to 211 in order to implement some hysteresis. The preferred control method for this control means is hard on/hard off so that resistive losses are minimised, and a closed: open ratio is selected so that the output voltage is kept at about a desired amount. Times are generally equivalent to tens or hundreds of cycles. A reference voltage source 213 provides a basis for comparison of some fraction of a supply voltage (208) in order to cause the switch to operate. In this case, the magnitude of capacitance D) in relation to the current $I_O$ drawn by the load L determines the repetition rate of ON or OFF commands to the switch. Preferably the repetition rate is of the order of 10 to 30 milliseconds and the mark:space ratio, which comprises the effect of regulation is determined at any time by the current provided to the load L in relation to the current obtained from the primary pathway P. Clearly, if the current $I_O$ drawn by the load L tends to zero, the proportion of time during which the switch 203 is open will tend to 100%.

The control means 203 is required to carry the resonating current, to withstand the likely peak open-circuit voltage and any transients, and should be bidirectional. The control means is a bidirectional switch and may be constructed using a variety of solid-state devices as is known in the art.

Preferably the bidirectional switch 203 is placed in the AC side of the circuit, preceding the rectifier, because of the possibility that otherwise high-voltage transients may cause breakdown of the components of the rectifier, although a unidirectional switch could be placed between rectifier 204 and line 208. In fact, we believe that if the switch is opened at other than a zero-crossing interval with respect to current, any remaining flux about the pickup coil will collapse into the windings and that resultant energy will then be dissipated either within the switch or within protective (snubber) devices.

Opening the switch 203 results in (1) destruction of the condition of resonance, and (2) interruption of the connection between the voltage source and the load, so that the output, as presented to the load L after rectification by rectifier module R, and smoothing by capacitor D, falls.

The output is a substantially constant voltage, the limits of its excursions being determined during normal operation by the hysteresis within the controller 207 and by the time taken to resume charging after the control means 203 is again closed. Alternatively a current-sensitive transducer configuration may be used to provide a substantially constant-current output. In this case a sense resistor or a magnetic device capable of sensing a current in a wire (LEM, Hall effect device or the like) provides a magnitude-sensitive input.

Figure 3:
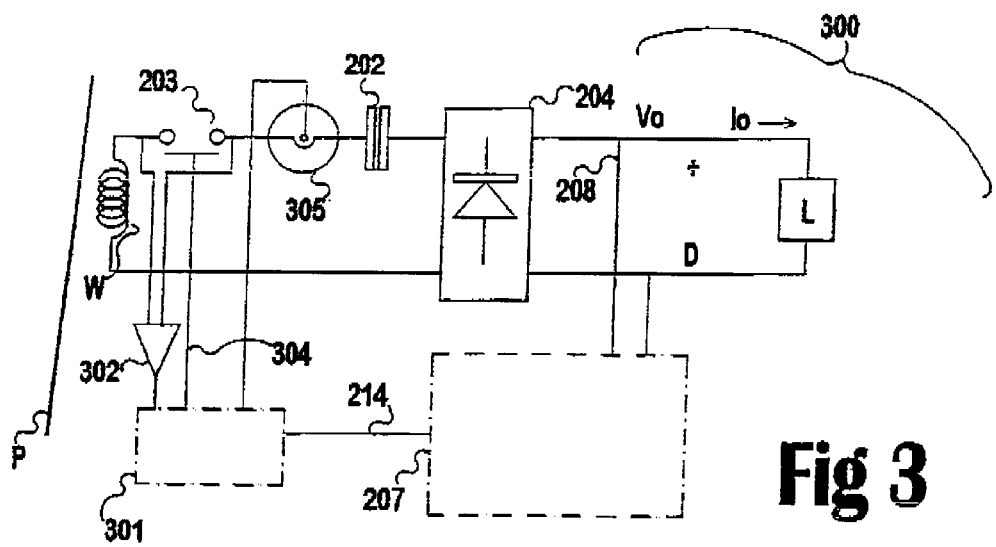
FIG. 3: shows a circuit diagram of a pickup control means according to the invention, including regulation means and means for determining precise control of timing of switch operations.

FIG. 3 shows methods for coping with some of the disadvantages of using a series-connected switch. The more practical circuit 300 includes the block 207, and also includes logic and sensing means, intended to cause the switch to delay opening until a moment occurs when zero current is detected in the adjacent wiring, and to delay closing until a moment occurs in which each of the opened switch contacts has the same voltage upon it.

A voltage comparison means 302 is connected across the switch 203 and its output, presented to logic circuitry, goes through a transition when the inputs become equal, The logic circuitry 301 comprises a circuit arrangement, well known to those skilled in the art, capable of delaying the forwarding (through control line 304) of a "CLOSE" command emanating from the block 207 through line 214 to the switch until such time as the output of 302 exhibits a transition. The logic circuitry 301 is also capable of delaying the emission of an "OPEN" command to the switch 203 until such time as the output of current sensor 305 indicates that zero current is detected in the adjacent wiring. The block 301 may comprise conventional logic devices, or a PAL or PLD logic circuit and appropriate preferably isolated drivers for the switch 203. In practice, example switching means might be a fast electromechanical relay, but more preferably a solid-state device such as a "TRIAC", or a back-to-back pair of unidirectional switching devices such as thyristors (also known as silicon controlled rectifiers), power FETs, IGBTs, or the like, along with suitable anti-transient protection means. Of course, novel devices suitable for this application may be produced in the future.

The additional synchronising equipment (sensors and logic) is preferred in order to increase the working life of the switching devices, and to prevent large and possibly damaging transients from being created within the secondary circuit, which transients may also be propagated into the primary line and, as interference, into the environment.

EXAMPLE 2

Figure 4:
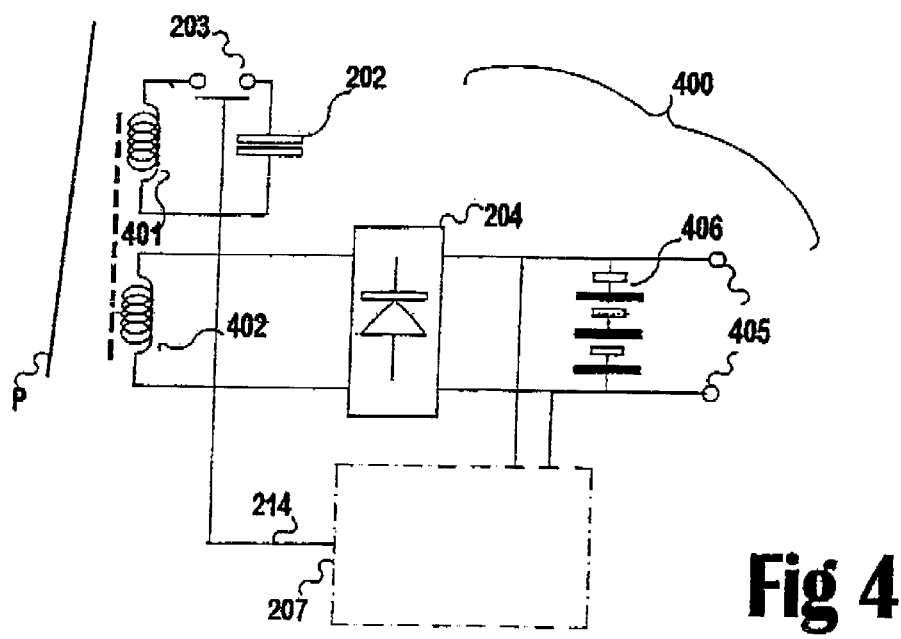
FIG. 4: shows a circuit diagram of a pickup control means according to the invention, including a second mutually coupled coil in which the series resonant coil is used for control and the non-resonant coil is used as a source of power.

FIG. 4 illustrates an optimised pickup arrangement suitable for example in the charging of batteries in which a first, high-voltage winding 401 is provided with a series tuned resonating capacitor 202 and a switch 203 capable of opening or closing fee circuit as described previously in this section. A second, low-voltage circuit comprises a simple coil 402 (the windings of which may in practice comprise a single turn) directly wired to a rectifier 204 which in turn feeds a battery module or monobloc 406. Control of the circuit (through block 207 and optionally also a block like 301 (details not shown)) may be either by supplied or drawn current or by voltage measurements of the across-battery voltage (or both). Coils 401 and 402 share a common core and when 401 is unable to resonate, the output of 402 is substantially reduced. This configuration has the advantage that the series switch is not required to interrupt a high current. Heavy current devices are more expensive than high voltage devices and heavy current devices would develop greater wastage. There are significantly reduced losses if a series switching device is used, as compared to a parallel-tuned, shorted switch option. This type of circuit is particularly suited to slow switching cycles of the order of 20 to 50 Hz whereas the supply frequency may be of the order of 15 kHz. Slow switching allows time for the resonant oscillations in the pickup to substantially stop.

Figure 5:
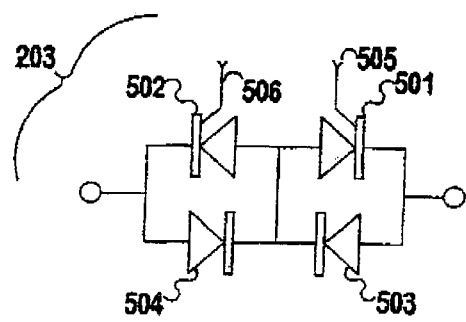
FIG. 5: shows usage of a diode-protected pair of asymmetrical silicon controlled rectifiers (ASCRs) as an example switching means.

FIG. 5 shows usage of a diode-protected pair of asymmetrical silicon controlled rectifiers (ASCRs) as a convenient way to provide, for the invention, a switching means 203 which will operate at zero-crossing moments. The ASCR device as a class is no longer widely used as a result of its poor inverse voltage rating (only 5 V or so causing damage). However it commutates, or turns off in the event of a reversal of applied voltage, quickly and typically within a microsecond. This is well within the 50 microsecond duration of a half-cycle at 10 kHz. Hence a configuration such as that shown in FIG. 5 simply has to inhibit the gate drive somewhere within the nearest preceding half-cycle and the device itself will switch off at the zero-crossing point. It would be less easy to employ a discrete current sensing means, logic, and then to control switching devices of the generic power FET type, which lack the self-commutation feature. FIG. 5 includes two ASCRs (501, 502) and one protective diode (503, 504) across each one, with gate control inputs 505, 506 supplied appropriately (such as with an isolated input which may well comprise a DC current source powered across an air gap by a controlled (switched) high frequency supply). Other than ASCRs, selected fast-recovery thyristors may also be used.

VARIATIONS

Variations of this principle of inductive power collection control may involve selection of alternative forms of switching devices including devices not known at the time of filing this specification.

Improved circuitry for the control of output may sense additional currents or voltages, and may also be susceptible to external control as by a human driver or from automatically generated commands.

While the actual mark:space ratio is usually set by the demand for power, in relation to the amount of power collected by the pickup when collecting, the repeat frequency of mark:space ratios may be varied over a wide range in order to optimise efficiency, device lifetime, interactions with other units, and interference The repetition rate of the invention may be as fast as once every cycle or two of the supply frequency or as slow as many hundreds of cycles, depending to some extent on the excursions of output voltage that can be tolerated by a particular kind of load.

The configurations described in this specification may be adapted towards higher speed control but switching losses may become significant and unless multiples of single cycles are switched, which provides large increments of control, significant transients may be generated when the switch is forced to operate irrespective of phase.

COMMERCIAL BENEFITS OR ADVANTAGES

There are a number of situations in which a series-resonant pickup offers more suitable forms of electric power than does a parallel resonant pickup. The invention, a control means for a series-resonant pickup loop which is capable of minimising the amount of current circulating within the pickup inductor, provides for the simultaneous and non-conflicting use of more than one pickup device sharing the same powered section of primary inductive pathway. Hitherto, it would be difficult to use more than one pickup device because of the opposing effect of high levels of circulating secondary current upon a primary current.

Although several preferred examples of the invention as described above have been disclosed for illustrative purposes, those skilled in the art will appreciate that various modifications, additions, and substitutions are possible without departing from the scope of the invention as set forth.

What is claimed is:

1. An inductive power pickup device having a series resonant circuit comprising a pickup coil and a resonating capacitor selected so that the pickup is capable of resonance at a system-wide frequency, the power pickup device further including power conditioning means capable of converting electricity that has been picked up into a conditioned form suitable for consumption by a load, characterised-in-that apparatus capable of controlling the amount of power picked up by the power pickup device comprises switching means in series with the pickup coil and in series with the resonating capacitor, together with switch controlling means causing the switching means to repetitively be in either an open or a closed state, so that by varying the respective proportion of time that the switching means is either open or is closed the time-averaged amount of power picked up by the power pickup device can be controlled, the pickup coil positioned adjacent a primary inductive conductor for intercepting a magnetic field surrounding the primary inductive conductor.

2. An inductive power pickup device as claimed in claim 1, characterised-in-that the switch control means is capable of providing a repetitive cyclic operation of the switching means which is inversely proportional to the amount of power to be collected by the pickup device.

3. An inductive power pickup device as claimed in claim 1, characterised-in-that the switching means is a solid-state switching means that comprises a set of inverse parallel fast-recovery thyristors.

4. An inductive power pickup device as claimed in claim 1, characterised-in-that the switching means is an asymmetrical silicon-controlled rectifier (ASCR).

5. An inductive power pickup device as claimed in claim 1, characterised-in-that the switch controlling means is capable of responding to the magnitude of the conditioned power in a manner that tends to regulate the magnitude of the conditioned power.

6. An inductive power pickup device as claimed in claim 1, characterised-in-that the switch controlling means is also capable of responding to the instantaneous voltage levels present at each side of the switching means and hence causing the switching means to close at an instant when the voltage levels present at each side of the switching means are substantially the same.

7. An inductive power pickup device as claimed in claim 6, characterised-in-that the switch controlling means is further capable of detecting the current passing through the switching means and is capable of determining when that current is at a zero crossing point, in order to determine an instant at which the switching means may be opened.

8. The pickup device of claim 1, wherein the switch controlling means comprises:

a switching rate determining capacitor connected across an output of the power conditioner means;

a voltage comparing circuit having on output connected to the switching means to control the opening and closing of the switching means;

a reference voltage connected as a first input to the voltage comparing circuit; and a fractional voltage of an output supply voltage of the power conditioner means connected as a second input to the voltage comparing circuit, wherein the voltage comparing circuit compares the reference voltage to the fractional voltage of the output supply voltage, and a capacitance of the switching rate determining capacitor, in relation to a current drawn from the power conditioner means by a load, determines a repetition rate of opening and closing of the switch.

9. An inductive power pickup device having a series resonant circuit comprising a pickup coil and a resonating capacitor selected so that the pickup is capable of resonance at a system-wide frequency, the power pickup device further including power conditioning means capable of converting electricity that has been picked up into a conditioned form suitable for consumption by a load, characterized in that an apparatus capable of controlling the amount of power picked up by the power pickup device comprises switching means in series with the pickup coil and in series with the resonating capacitor, together with switch controlling means capable of causing the switching means to repetitively be in either an open or a closed state, so that by varying the respective proportion of time that the switching means is either open or is closed the time-averaged amount of power picked up by the power pickup device can be controlled and wherein the switch controlling means is capable of responding to the voltage of the conditioned power.

10. An inductive power pickup device as claimed in claim 9, characterized in that the switch controlling means is capable of providing a relatively slow repetitive cyclic operation of the switching means, so that induced resonating currents may substantially die away during a normal "OFF" interval.

11. An inductive power pickup device as claimed in claim 10, characterized in that the switch control means is capable of providing a repetitive cyclic operation of the switching means which is inversely proportional to the amount of power to be collected by the pickup device.

12. An inductive power pickup device as claimed in claim 10, characterized in that the switching means comprises a bi-directional solid-state switching means capable of controlling an alternating current.

13. An inductive power pickup device as claimed in claim 12, characterized in that the solid-state switching means comprises a set of inverse parallel fast-recovery thyristors.

14. An inductive power pickup device as claimed in claim 12, characterized in that the switching means is an asymmetrical silicon-controlled rectifier (ASCR).

15. An inductive power pickup device as claimed in claim 10, characterized in that the switch controlling means is capable of responding to the magnitude of the conditioned power in a manner that tends to regulate the magnitude of the conditioned power.

16. An inductive power pickup device as claimed in claim 9, characterized in that the switch controlling means is also capable of responding to the instantaneous voltage levels present at each side of the switching means and hence causing the switching means to close at an instant when the voltage levels present at each side of the switching means are substantially the same.

17. An inductive power pickup device as claimed in claim 9, characterized in that the switch controlling means is further capable of detecting the current passing through the switching means and is capable of determining when that current is at a zero crossing point, in order to determine an instant at which the switching means may be opened.

18. The pickup device of claim 9, wherein the switch controlling means comprises:

a switching rate determining capacitor connected across an output of the power conditioner means;

a voltage comparing circuit comprising an operational amplifier having on output connected to the switching means to control the opening and closing of the switching means;

a reference voltage connected as a first input to the operational amplifier; and a fractional voltage of an output supply voltage of the power conditioner means connected as a second input to the operational amplifier, wherein, a capacitance of the switching rate determining capacitor, in relation to a current drawn from the power conditioner means by a load, determines a repetition rate of opening and closing of the switch.

19. An inductive power pickup device, comprising:

a series resonant circuit comprising a switch in series with a pickup coil positioned for intercepting a magnetic field surrounding a primary inductive conductor, the pickup coil in series with a resonating capacitor, the capacitor selected to provide a pickup capable of resonance at a system-wide frequency;

a power conditioner connected across the pickup coil and capacitor for converting electricity that has been picked up by the series resonant circuit into a conditioned power, the conditioned power being at an output of the power conditioner at a supply voltage and in a form suitable for load consumption;

a switch controlling circuit connected to open and close the switch, the switch controlling circuit being responsive to the supply voltage of the conditioned power in opening and closing the switch, the switch controlling circuit repetitively opening and closing the switch to vary a time that the switch is open so that a time-averaged amount of power picked up by the series resonant circuit is controlled.

20. The pickup device of claim 19, wherein the switch controlling circuit comprises:

a switching rate determining capacitor connected across the output of the power conditioner;

a voltage comparing circuit having on output connected to the switch to control the opening and closing of the switch;

a reference voltage connected as a first input to the voltage comparing circuit; and a fractional voltage of the supply voltage of the conditioned power connected as a second input to the voltage comparing circuit, wherein the voltage comparing circuit compares the reference voltage to the fractional voltage of the supply voltage as a basis for controlling the opening and closing of the switch, and a capacitance of the switching rate determining capacitor, in relation to a current drawn from the power conditioner by a load, determines a repetition rate of opening and closing of the switch.

* * * * *